UNITED STATES PATENT OFFICE.

CHARLES E. AVERY, OF BOSTON, MASSACHUSETTS, ASSIGNOR TO THE AVERY LACTATE COMPANY, OF PORTSMOUTH, NEW HAMPSHIRE.

MANUFACTURE OF LACTATES.

SPECIFICATION forming part of Letters Patent No. 243,827, dated July 5, 1881.

Application filed December 21, 1880. (No specimens.)

*To all whom it may concern:*

Be it known that I, CHARLES E. AVERY, of Boston, in the county of Suffolk and State of Massachusetts, have invented certain Improvements in Process for the Manufacture of Lactic Acid and the Lactates, of which the following is a specification.

This invention relates to the manufacture of lactic acid and the lactates, as will be more fully set forth hereinafter.

Hitherto the lactic fermentation has been of an almost insupportable odor, and the manufacture of lactates a nuisance, involving a considerable outlay of time and expense in the subsequent necessary purification. The time hitherto required for fermentation has been from ten days to several weeks. By my process the fermentation is completed in from two to four days, and hence it is carried out without putrefactive fermentation and its noxious odors, and with little or no butyric fermentations and its waste of material.

In carrying out my invention I take a vegetable fermentable sugar, (such as sucrose, dextrose, levulose, or maltose,) which may be derived from sugar, starch, or other suitable source by the ordinary means, and add thereto water, preferably in the proportion of one thousand pounds of fermentable sugar to six thousand pounds of water, though I do not confine myself to any exact proportions.

To the mixture I add vegetable matter containing nitrogenous matter, about one hundred pounds of nitrogenous matter of vegetable origin to the quantity of sugar and water above named being a good proportion. It is desirable that the vegetable matter be finely divided, and that a portion of the nitrogenous matter be soluble in water. To the above liquid I next add a portion of matter already in active lactic fermentation as conducted in the ordinary manner; or I may take a previous fermentation of the same composition as that herein described and containing the living beings which cause that fermentation. From one to ten per cent. of the entire quantity of the liquid will give good results.

I usually keep the solution during fermentation between 120° Fahrenheit and 80° Fahrenheit, preferring to ferment at from 95° to 105° Fahrenheit, lactic acid being thus formed at the expense of the sugar, and as fast as the acid is formed I neutralize it.

The neutralizing substance used may be the carbonate of soda, potash, lime, magnesia, or zinc, the oxides of lime, magnesia, or zinc, or the hydrates of soda, potash, lime, magnesia, or zinc. If strongly-alkaline substances are used, they must be added cautiously and only in such quantity as to neutralize the acid already formed. If faintly-alkaline bodies be used, such as carbonate of lime, the full amount required may be added in fine powder at once. For the mixture already described five hundred pounds of carbonate of lime in fine powder is sufficient, or a chemically-equivalent quantity of any of the other neutralizers. In this latter case the advantage of the use of carbonate of lime is that as the acid is developed in the liquid it seizes upon a portion of the lime base, and the acid is thus neutralized, and this going on gradually and continuously becomes self-regulating, and obviates the necessity of continual additions of the neutralizing substance.

I prefer to derive the sugar and the nitrogenous matter above referred to from the same source, using, by preference, meal or flour of Indian corn or other grains, as above stated. The starch contained in the meal is changed to sugar by acids or diastase or other zymose, and the residue supplies the requisite vegetable nitrogenous matter.

Sugar-beet root, sugar-melon, sugar-cane, cornstalks, grapes, and other fruit may be employed, and the refuse will furnish the vegetable nitrogenous matter.

I am aware that I am not the first to ferment sugar with vegetable nitrogenous matter derived from other than cereals, as this is done in the manufacture of sauerkraut; but, so far as I am aware, I am the first to add a neutralizer to the mixture in order that it may ferment quickly and thoroughly and be easily and cheaply purified.

I am also aware that the United States Dispensatory mentions other cases of vegetable matter undergoing lactic fermentation; but it would be impossible by the methods therein described to obtain my results; and by my process putrefaction is prevented and I am enabled to avoid butyric, viscous, and mannitic fermentations and the molds incidental to the processes hitherto in use. It is to be observed that my process of the manufacture of lactic acid and lactates may be carried on without the addition or presence of cheese or any animal nitrogenous matter heretofore used for the purpose of developing lactic acid in fermentescible liquids, the result of which was the development and escape of various ethers and higher homologues of the fermenting body, which was accompanied by unpleasant and insalubrious odors, and which has rendered such factories a nuisance; and this constitutes a chief feature of my invention.

Having thus described my invention, I claim—

The method of manufacturing lactic acid and lactates by the fermentation of a sugar of vegetable origin with a lactic ferment in the presence of nitrogenous matters, chiefly of vegetable origin, and of a substance suitable to gradually neutralize the acid as fast as formed, as set forth, whereby time is economized, putrefaction prevented, and purification rendered simple and inexpensive.

In testimony whereof I have signed my name to this specification, in the presence of two subscribing witnesses, this 17th day of December, A. D. 1880.

CHARLES E. AVERY.

Witnesses:
C. F. BROWN,
W. CLIMO.